Oct. 24, 1944.   J. A. BOLT ET AL   2,361,080
DIESEL FUEL
Filed Aug. 25, 1941
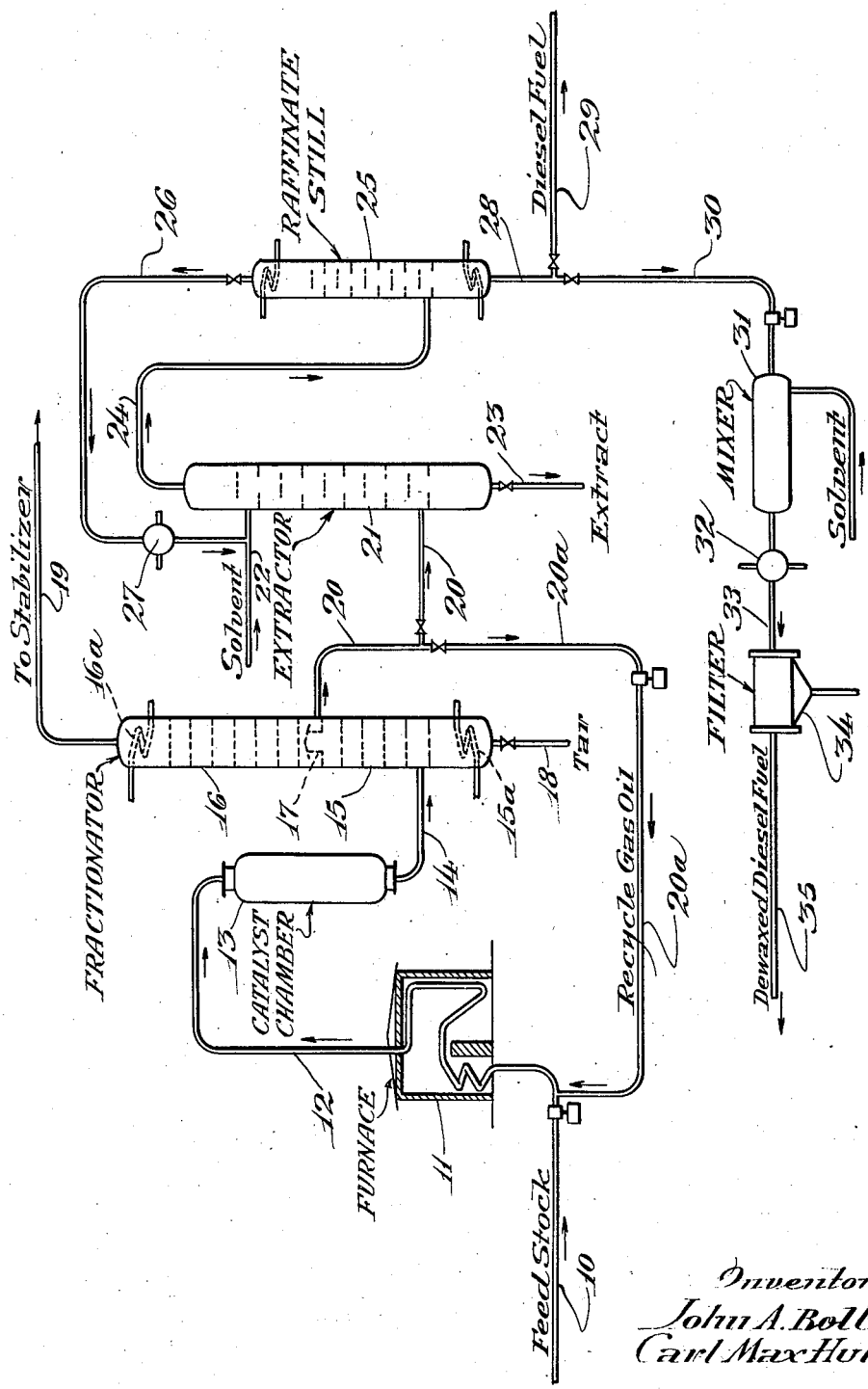
Inventors:
John A. Bolt
Carl Max Hull
By Arthur H. Bransky
Attorney Patented Oct. 24, 1944

2,361,080

UNITED STATES PATENT OFFICE 2,361,080

DIESEL FUEL

John A. Bolt and Carl Max Hull, Chicago, Ill., assignors to Standard Oil Company, Chicago, Ill., a corporation of Indiana Application August 25, 1941, Serial No. 408,172

5 Claims. (Cl. 196—150)

The present invention relates to improved fuels for Diesel engines and particularly to improved fuels for Diesel engines of the high speed type.

The so-called low speed Diesel engines customarily used in stationary power plant installations are adapted to the use of a wide variety of fuels. This, however, is not true of the newer high speed types of Diesel engines suitable for automobile, airplane or rail car use. These types of engines not only require clean high grade fuels having physical properties falling within a relatively narrow range, but they also require fuels having chemical properties such as to give the proper ignition qualities. The ignition qualities of Diesel fuels are usually defined by their cetane numbers. The so-called cetane number of a Diesel fuel is determined by comparing the knock induced by the fuel in question with the knock produced by a standard fuel comprising a blend of cetane and alpha methyl naphthalene. Cetane used as a Diesel fuel has excellent ignition properties and therefore produces little or no knock, whereas alpha methyl naphthalene is a knock inducer. A Diesel fuel of good ignition properties is therefore one which corresponds to a blend containing a large percentage of cetane.

It is an object of the present invention to provide an improved Diesel engine fuel having improved ignition properties. It is a further object of the invention to provide a method of obtaining an improved Diesel engine fuel having improved ignition characteristics. Other objects and advantages of the invention will become apparent from the following description thereof read in conjunction with the accompanying drawing which forms a part of the specification and which is a flow diagram of one embodiment of the invention.

We have discovered that a Diesel engine fuel having desirable high speed ignition characteristics can be obtained by solvent extracting catalytic cycle stock gas oils with a suitable solvent and employing the raffinate, freed of the solvent, and preferably the dewaxed raffinate, as a Diesel fuel. By employing the dewaxed raffinate, fuels having high cetane numbers and low pour points are obtained.

In order that the present invention may be more clearly understood the same will be described in connection with the accompanying flow diagram which is employed merely by way of illustration and is not intended to be a limitation upon the scope of our invention.

Referring to the drawing, a feed stock, which is preferably a gas oil, from line 10 is introduced into a furnace 11, wherein it is heated to the desired reaction temperature, and passed through a transfer line 12 to a catalyst chamber 13. In the catalyst chamber, fixed bed, moving bed, or powdered catalyst operations may be employed, and various types of catalyst can be used. It is preferred however to employ solid refractory cracking catalyst of the metal oxide type such as silica-alumina, silica-magnesia, alumina-zirconia, silica-zirconia-alumina, silica gel promoted with one or more metal oxides adsorbed therein for example, magnesia and/or alumina, acid-treated bentonite, other acid-treated clays, such as Super Filtrol, and other natural and synthetic refractory catalysts of the solid metal oxide type.

As aforementioned, fixed bed, granular moving bed, granular or flowing powdered catalyst techniques may be used in the catalytic stage. In fixed or moving bed operations a space velocity within the range of 0.2 and 6 volumes of oil per volume of gross catalyst space per hour and a catalyst holding time of between about 10 minutes and 4 hours, for example, 1 hour, may be used. In powdered catalyst technique a space velocity of between 1–20 for example 5 volumes of oil per volume of catalyst at rest per hour and a catalyst holding time between about .5 and 60 minutes for example, about 5 minutes may be used. In each of the foregoing techniques a pressure of between about 0 and 50 pounds per square inch gauge and a reaction temperature within the range of about 800° F. to 1000° F. are preferred. However, temperatures within the range of about 750° F. and about 1050° F. may be used. Regardless of the technique or operating conditions used we prefer to obtain a cycle gas oil corresponding to a gasoline yield of 40% or higher. This may be obtained in single or multipass operation.

The catalytically cracked material from catalyst chamber 13 passes through a transfer line 14 to an evaporator 15, provided with a heating coil 15a, which is shown integral with a bubble tower 16, provided with a cooling coil 16a, and separated therefrom by a trap-out tray 17. From the bottom of the evaporator 15 a tar fraction is removed through a valved line 18. All material lighter than tar passes overhead from the evaporator 15 through a trap-out tray 17 into the bubble tower 16. Vapors from the bubble tower 16 are withdrawn overhead through a line 19 and may be subsequently processed such as by condensing the same and stabilizing the condensed material in a suitable stabilizer (not shown). A catalytic cycle stock gas oil fraction is removed from the trap-out tray 17 and a portion or all of this fraction passed through line 20 to an extractor 21 wherein it is subjected to a solvent extraction process. That part of the cycle gas oil not passed to line 20 is recycled through line 20A to feed line 10.

Various solvents may be employed in the extraction of the gas oil fraction for example, suitable selective solvents for aromatics such as nitromethane and nitroethane, nitroparaffin-$SO_2$, benzol-acetone, furfural, methyl ethyl ketone, liquefied sulfur dioxide, benzol-$SO_2$, chlorex, and other oxygen or halogen containing organic solvents boiling below about 350° F. Usually a solvent to oil ratio of between about 1:1 and 4:1 is used. For example a ratio of 3:1 is preferred when nitromethane is used as a solvent. The gas oil fraction is introduced preferably into the extractor 21 at a slightly elevated temperature, for example 100° F. to about 150° F., and the solvent is introduced into extractor 21 through line 22. If the solvent is heavier than the gas oil, the solvent is introduced at the top (as shown) while if lighter than the oil, it is introduced at the bottom. If desired, extractor 21 may be supplied at either or both ends with suitable cooling means (not shown). The solution of solvent and the extracted material is withdrawn from extractor 21 through a valved line 23. The solvent recovered from the extract by suitable means, such as distillation, may be recycled to the extractor and the solvent-free extract subsequently may be further processed if desired.

The raffinate is withdrawn from the extractor 21 through a line 24 and introduced into a raffinate still 25 wherein a gas oil raffinate is freed of solvent, which is withdrawn through a line 26, cooled in a condenser 27 and if desired combined with the solvent in line 22 or returned to the solvent storage (not shown). The solvent-free raffinate is withdrawn from the base of the still 25 through a valved line 28 and a line 29 to a raffinate storage tank (not shown). The raffinate, as such, may be used as a Diesel fuel or it may be distilled to any desired end point or boiling range.

To obtain a low pour point Diesel fuel the raffinate, removed from the still 25, may be subjected to a suitable dewaxing process. Thus the gas oil raffinate may be passed through a line 30 and mixed with a suitable wax solvent such as a mixture of acetone and benzol in a mixer 31 and then chilled to a temperature of about −10° F. in a chiller 32. The chilled mixture of gas oil raffinate and wax solvent is then passed through a line 33 to a wax filter press 34 wherein the wax is removed from the gas oil raffinate solution, which is removed from the filter press through a line 35 and subsequently freed of the wax solvent by suitable means such as by distillation. It is to be understood of course that the gas oil raffinate may be dewaxed by other suitable means such as by a propane dewaxing process.

The suitability of catalytic cycle stock raffinate as Diesel engine fuels is demonstrated by the pour point and cetane number data presented in the table below. The following fuels were used in obtaining these data.

*Fuel A.*—A virgin gas oil having the following inspection:

Gravity _____° A. P. I__ 35
Distillation:
    Initial boiling point_____° F__ 445
        10% _____° F__ 489
        50% _____° F__ 557
        90% _____° F__ 675
    Maximum boiling point_____° F__ 727
    Average boiling point_____° F__ 569

*Fuel B.*—A raffinate from the chlorex extraction of fuel A having the following inspection:

Gravity _____° A. P. I__ 38.3
Distillation:
    Initial boiling point_____° F__ 480
        10% _____° F__ 510
        50% _____° F__ 560
        90% _____° F__ 687
    Maximum boiling point_____° F__ 738
    Average boiling point_____° F__ 578

*Fuel C.*—A raffinate from the nitromethane extraction of a 34° A. P. I. catalytic cycle stock gas oil having the following inspection:

Gravity _____° A. P. I__ 42.5
Distillation:
    Initial boiling point_____° F__ 443
        10% _____° F__ 473
        50% _____° F__ 532
        90% _____° F__ 615
    Maximum boiling point_____° F__ 670
    Average boiling point_____° F__ 537

*Fuel D.*—A raffinate from the nitromethane extraction of a 32° A. P. I. catalytic cycle stock gas oil having the following inspection:

Gravity _____° A. P. I__ 42.7
Distillation:
    Initial boiling point_____° F__ 472
        10% _____° F__ 516
        50% _____° F__ 560
        90% _____° F__ 634
    Maximum boiling point_____° F__ 682
    Average boiling point_____° F__ 566

Each of the above fuels was dewaxed by diluting the same in a mixture of acetone and benzol and chilled to a temperature of about −10° F. and the wax removed by filtration.

*Fuel E.*—A raffinate of a thermally cracked gas oil stock having the following inspection:

Gravity _____° A. P. I__ 33.8
Distillation:
    Initial boiling point_____° F__ 388
        10% _____° F__ 432
        50% _____° F__ 507
        90% _____° F__ 656
    Maximum boiling point_____° F__ 730
    Average boiling point_____° F__ 525

The pour points and cetane numbers of each of the above wax-containing and dewaxed fuels are tabulated in the following table.

| | Pour point | Cetane No. |
|---|---|---|
| | °F. | |
| Fuel A (virgin) | +25 | 56 |
| Fuel A—dewaxed | +5 | 52 |
| | 1 0 | 51 |
| Fuel B (virgin raffinate) | +35 | 65 |
| Fuel B—dewaxed | +5 | 61 |
| | 1 0 | 60 |
| Fuel C (catalytic raffinate #1) | +35 | 76 |
| Fuel C—dewaxed | +10 | 67 |
| | 1 0 | 65 |
| Fuel D (catalytic raffinate #2) | +45 | 76 |
| Fuel D—dewaxed | +15 | 70 |
| | 1 0 | 67 |
| Fuel E (thermal raffinate) | +10 | 46 |

[1] Extrapolated.

The above data show that the raffinates of catalytically cracked cycle stock gas oils (fuels C and D) have better ignition characteristics, that is higher cetane numbers, than either the raffinate of virgin gas oil (fuel B) or the raffinate of thermally cracked cycle stock gas oil (fuel E), and therefore such material is very well adapted for use as Diesel engine fuels.

The raffinate of catalytically cracked cycle stock gas oil can be employed as such, without dewaxing the same, although the high pour point of the product may necessitate the addition of suitable pour point depressants to the fuel. Well known pour point depressants which may be employed are natural or residual asphalts, petroleum residuums and pour point depressants of the condensation type, such as those described in United States Patents Nos. 1,963,917, 1,963,918, and others, obtained by condensing a halogenated paraffin with an aromatic hydrocarbon, such as naphthalene in the presence of a catalyst of the Friedel-Crafts type such as $AlCl_3$. It is, however, preferable to dewax the raffinate in order to reduce the pour point of the product even though the cetane number is somewhat reduced by dewaxing.

In the event the raffinate, or the dewaxed raffinate, has distillation characteristics outside those desired for the Diesel fuel, it may be distilled to the desired distillation range.

The raffinate or the dewaxed raffinate may be used as such for the Diesel engine fuel or it may be blended with other Diesel fuels to enhance the cetane number of the latter.

While we have described our invention in connection with certain specific embodiments thereof, the same are not to be considered a limitation upon the scope of our invention which is defined by the following claims.

We claim:

1. A Diesel engine fuel having improved ignition characteristics comprising the raffinate of a nitroparaffin extracted catalytically cracked cycle stock gas oil, said raffinate having a cetane number above about 65 when dewaxed to about 0° F. pour point, and distilling within the distillation range of Diesel fuel.

2. A Diesel engine fuel having improved ignition characteristics comprising the raffinate of a nitromethane extracted catalytically cracked cycle stock gas oil, said raffinate having a cetane number above about 65 when dewaxed to about 0° F. pour point, and distilling within the distillation range of Diesel fuel.

3. A Diesel engine fuel having improved ignition characteristics comprising the raffinate of a liquid sulfur dioxide extracted catalytically cracked cycle stock gas oil, said raffinate having a cetane number above about 65 when dewaxed to about 0° F. pour point, and distilling within the distillation range of Diesel fuel.

4. A Diesel engine fuel comprising the raffinate of a solvent extracted catalytically cracked cycle stock gas oil, said raffinate having a cetane number above about 65 when dewaxed to about 0° F. pour point and boiling within the distillation range of Diesel fuel.

5. A Diesel engine fuel having improved ignition characteristics comprising the raffinate of a catalytically cracked cycle stock extracted with a solvent selective for aromatic hydrocarbons, said raffinate having a cetane number above about 65 when dewaxed to about 0° F. pour point and boiling within the distillation range of Diesel fuel.

JOHN A. BOLT.
CARL MAX HULL.